US011481555B2

(12) United States Patent
Tso et al.

(10) Patent No.: US 11,481,555 B2
(45) Date of Patent: Oct. 25, 2022

(54) PROJECT GENERATING SYSTEM AND METHOD THEREOF

(71) Applicant: INDUSTRIAL TECHNOLOGY RESEARCH INSTITUTE, Hsinchu (TW)

(72) Inventors: Tsung-Wen Tso, Hsinchu (TW); Chin-Yang Lin, Changhua County (TW); En-Tzu Wang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 418 days.

(21) Appl. No.: 16/723,042

(22) Filed: Dec. 20, 2019

(65) Prior Publication Data

US 2021/0117620 A1 Apr. 22, 2021

(30) Foreign Application Priority Data

Oct. 16, 2019 (TW) .................... 108137289

(51) Int. Cl.
*G06F 40/284* (2020.01)
*G06F 40/205* (2020.01)
(Continued)

(52) U.S. Cl.
CPC .......... *G06F 40/284* (2020.01); *G06F 16/148* (2019.01); *G06F 16/156* (2019.01);
(Continued)

(58) Field of Classification Search
CPC .... G06F 40/284; G06F 16/148; G06F 16/156; G06F 16/29; G06F 16/9035;
(Continued)

(56) References Cited

U.S. PATENT DOCUMENTS 6,842,737 B1 1/2005 McIndoe et al.
9,618,343 B2 * 4/2017 Kahn .................. G06F 16/9535
(Continued)

FOREIGN PATENT DOCUMENTS

CN 107679226 B 2/2018
CN 107526800 B 3/2019
(Continued)

OTHER PUBLICATIONS

Malik et al., "Google Flu Trends" and Emergency Department Triage Data Predicted the 2009 Pandemic H1N1 Waves in Manitoba. Jul. 2011.
(Continued)

*Primary Examiner* — Ashish Thomas
*Assistant Examiner* — Abdullah A Daud
(74) *Attorney, Agent, or Firm* — Maschoff Brennan

(57) ABSTRACT

A project generating method comprises extracting a keyword from a plurality of text files with a specified category, determining whether the keyword is a theme, extracting a geographical name from the text files corresponding to the theme, determining whether to keep the theme according to an internet volume of the theme, filtering a plurality of review files from a review website according to the geographical name, calculating a first ratio therein to determining whether to keep the theme, and generating a project including the geographical name and the theme serving as a recommendation row.

20 Claims, 3 Drawing Sheets

(51) Int. Cl.
  *G06F 16/14* (2019.01)
  *G06F 16/953* (2019.01)
  *G06F 16/29* (2019.01)
  *G06F 16/9035* (2019.01)

(52) U.S. Cl.
  CPC .......... *G06F 16/29* (2019.01); *G06F 16/9035* (2019.01); *G06F 16/953* (2019.01); *G06F 40/205* (2020.01)

(58) Field of Classification Search
  CPC .. G06F 16/953; G06F 40/205; G06F 16/3334; G06F 40/279; G06Q 30/0201; G06Q 30/0251
  USPC ........................................................ 707/738
  See application file for complete search history.

(56) References Cited

U.S. PATENT DOCUMENTS

| | | | |
|---|---|---|---|
| 11,163,875 B1 * | 11/2021 | Roundy | G06F 21/56 |
| 2007/0299815 A1 * | 12/2007 | Starbuck | G06F 16/3326 |
| 2008/0222119 A1 | 9/2008 | Dai et al. | |
| 2008/0243821 A1 * | 10/2008 | Delli Santi | G06Q 30/0251 707/999.005 |
| 2010/0198655 A1 * | 8/2010 | Ketchum | G06Q 20/10 705/37 |
| 2011/0153654 A1 | 6/2011 | Lee | |
| 2012/0232788 A1 * | 9/2012 | Diao | G01C 21/20 707/E17.046 |
| 2013/0054371 A1 * | 2/2013 | Mason | G06Q 30/0256 705/14.64 |
| 2013/0144869 A1 * | 6/2013 | Shalabi | G06F 16/9535 707/E17.014 |
| 2013/0166565 A1 * | 6/2013 | Lepsoe | G06F 16/358 707/740 |
| 2014/0032708 A1 * | 1/2014 | Zamir | G06F 16/9537 709/217 |
| 2014/0156665 A1 * | 6/2014 | Kraley | G06F 16/35 707/739 |
| 2014/0214883 A1 | 7/2014 | Apte et al. | |
| 2014/0279003 A1 * | 9/2014 | Grigg | G06Q 30/0261 705/14.58 |
| 2015/0074131 A1 * | 3/2015 | Fernandez | G06F 16/435 707/758 |
| 2015/0186497 A1 * | 7/2015 | Patton | H04W 4/21 707/740 |
| 2015/0262069 A1 | 9/2015 | Gabriel et al. | |
| 2016/0357770 A1 * | 12/2016 | Wu | G06Q 10/10 |
| 2017/0220668 A1 * | 8/2017 | Patton | G06F 16/951 |
| 2018/0114136 A1 * | 4/2018 | Kumar | G06N 20/00 |
| 2018/0188052 A1 * | 7/2018 | Singh | G01C 21/3476 |
| 2018/0225677 A1 | 8/2018 | Doane et al. | |
| 2019/0340554 A1 * | 11/2019 | Dotan-Cohen | G06Q 10/06313 |
| 2020/0273160 A1 * | 8/2020 | Zhang | G16H 30/40 |

FOREIGN PATENT DOCUMENTS

| | | | |
|---|---|---|---|
| CN | 109492168 A | | 3/2019 |
| CN | 110083645 A | | 8/2019 |
| JP | 2010101838 A | * | 5/2010 |

OTHER PUBLICATIONS

Rivera, R., "A dynamic linear model to forecast hotel registartions in Puerto Rico using Google Trends data." Feb. 29, 2016.
Bragazzi et al., "A Google Trends-based approach for monitoring NSSI." Dec. 2013.
Nghiem et al. "Analysis of the Capacity of Google Trends to Measure Interest in Conservation Topics and the Role of Online News" Mar. 30, 2016.
Rech et al. "Discovering Trends in Software Engineering with Google Trend, ACM SIGSOFT 32(2), 1." Mar. 2007.
Onder, I "Forecasting Tourism Demand with Google Trends for a Major European City Destination." Aug. 2017.
Havranek et al. "Forecasting Tourist Arrivals: Google Trends Meets Mixed Frequency Data, research paper, Czech National Bank, Charles University, Prague, University of Economics, Prague." Nov. 22, 2018.
Hamid et al., "Forecasting volatility with empirical similarity and Google Trends." Sep. 2015, pp. 62-81.
Fond et al. "Google Trends: Ready for real time suicide prevention or just a Zeta-Jones effect?" Jan. 2015.
Prouix et al. "Googling Trends in Conservation Biology." Aug. 2013.
Zhu et al., "Hot Topic Detection Based on a Refined TF-IDF Algorithm." Jan. 31, 2019.
Bragazzi et al., "Infodemiology of status epilepticus: A systematic validation of the Google Trends-based search queries." Dec. 2015.
Cervellin et al., "Is Google Trends a reliable tool for digital epidemiology? Insights from different clinical settings." Jun. 2017.
Challet et al., "Predicting financial markets with Google Trends and not so random keywords." Aug. 2013.
Choi et al. "Predicting the Present with Google Trends." Apr. 10, 2009.
Kabaria, H., "Predicting tourism trends with Google Insights." Jan. 2011.
Hand et al., "Searching for the picture: forecasting UK cinema admissions making use of Google Trends data." Jul. 2012.
Allan et al., "Seasonality of Ankle Swelling: Population Symptom Reporting Using Google Trends." Jul. 2016.
Mihalcea et al., "TextRank: Bringing Order into Text" Jul. 2004.
Lin et al., "Topic Detection from Short Text: A Term-based Consensus Clustering Method. 13th International Conference on Service Systems and Service Management." Jun. 2016.
Dergiades et al. "Tweets, Google trends, and sovereign spreads in the GIIPS." Apr. 2015.
TW Office Action in Application No. 108137289 dated Oct. 29, 2020.

* cited by examiner

PROJECT GENERATING SYSTEM AND METHOD THEREOF

CROSS-REFERENCE TO RELATED APPLICATIONS

This non-provisional application claims priority under 35 U.S.C. § 119(a) on Patent Application No(s). 108137289 filed in Taiwan on Oct. 16, 2019, the entire contents of which are hereby incorporated by reference.

BACKGROUND

1. Technical Field

The present disclosure relates to analysis of internet articles, and a system for obtaining a popular theme from the internet articles and generating a project accordingly, as well as a method thereof.

2. Related Art

Due to the bandwagon effect, people tend to visit the relevant locations of popular themes, such as dining at a gourmet appraisal winning restaurant, hunting for monsters of Pokemon Masters in the place where rare virtual monsters appear.

Therefore, marketing executives often search recent popular themes on the internet and determine whether these themes can increase the number of visitors of a certain location. For example, the travel agency proposes regional-theme projects such as "International Children's Folklore & Folkgame Festival in Yilan", "Taipei Marathon" and "Tung Blossom in Miaoli" to attract people to participate thus visit Yilan, Taipei, and Miaoli in Taiwan. However, not every popular theme can promote local tourism. Sometimes a popular theme may reduce the travel motivation of the location related to the theme. On the other hand, the fixed-cycle events, such as Music Festivals, Lantern Festivals, and Dajia Matsu Pilgrimage, may be held in different places every time. In view of the above, it is in need of an automatic mechanism to determine whether a popular theme can bring the traveling crowds in specific locations as well as to search a location to which people are willing to travel due to popular theme.

SUMMARY

According to an embodiment of the present disclosure, a project generating method configured to be performed by a computer, with said project generating method comprising: obtaining a plurality of text files, wherein each of the text files belongs to one of a plurality of categories; extracting a keyword from the plurality of text files and calculating a theme parameter of the keyword to determine whether the keyword is a theme; extracting a geographical name from the plurality of text files corresponding to the theme and defining the theme and the geographical name as a pair; determining whether to keep the theme according to an internet volume of the theme after the pair is generated; filtering a plurality of review files from a review website according to the geographical name to obtain filtered review files after the theme is determined to be kept according to an internet volume; calculating a first rate of the theme, wherein the first rate is a rate of a number of a part of the filtered review files referring the theme to a total number of the filtered review files, and determining whether to keep the theme according to the first rate; and generating a project after the theme is determined to be kept according to the first rate, wherein the project comprises a recommendation row comprising the geographical name and the theme.

According to an embodiment of the present disclosure, a project generating system comprising a communication device configured to obtain a plurality of text files from a first server, obtain a plurality of review file from a second server, and obtain an internet volume of a word from a third server; a non-transitory computer-readable medium configured to store a plurality of instructions; and one or more processing devices electrically connecting to the communication device and the non-transitory computer-readable medium, wherein the one or more processing device is configured to perform the plurality of instructions and cause a plurality of operations and the plurality of operations comprises: extracting a keyword from the plurality of text files and calculating a theme parameter of the keyword to determine whether the keyword is a theme, wherein each of the text files belongs to one of a plurality of categories; extracting a geographical name from the plurality of text files corresponding to the theme and defining the theme and the geographical name as a pair; determining whether to keep the theme according to an internet volume of the theme after the pair is generated; filtering a plurality of review files from a review website according to the geographical name to obtain filtered review files after the theme is determined to be kept according to an internet volume; calculating a first rate of the theme, wherein the first rate is a rate of a number of a part of the filtered review files referring the theme to a total number of the filtered review files, and determining whether to keep the theme according to the first rate; and generating a project after the theme is determined to be kept according to the first rate, wherein the project comprises a recommendation row comprising the geographical name and the theme.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. The following examples further illustrate the perspective of the present disclosure in detail, but these examples should not be viewed as limitations of the present disclosure.

The present disclosure is proposed based on the concept that the internet volume of a location and a human flow quantity of the location are in direct proportion. The present disclosure may be adapted to various aspects such as tourism and food, and the "tourism" aspect is served as an example in the following description. However, the present disclosure is not limited thereto.

Figure 1:
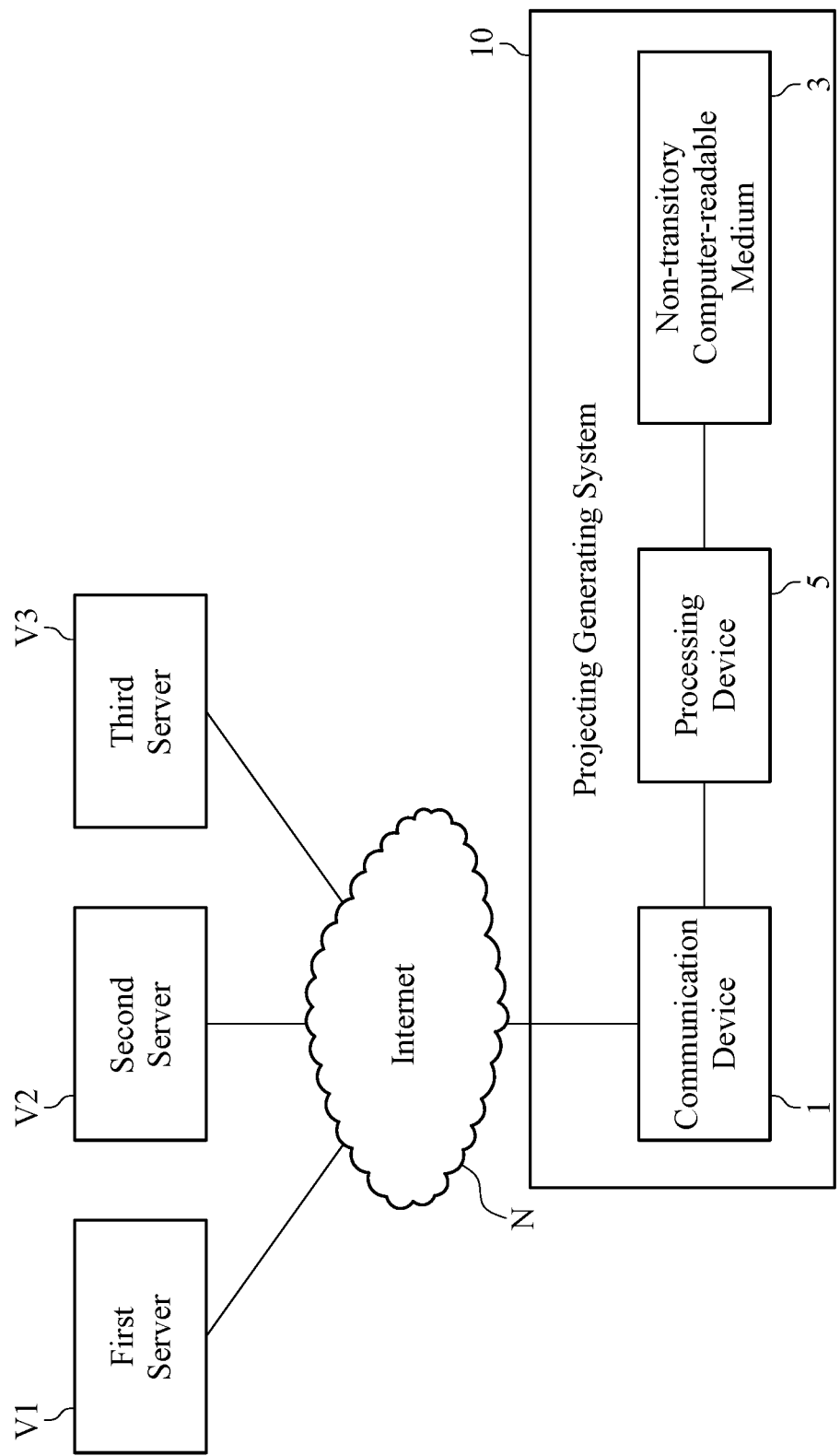
FIG. 1 is a block diagram of the project generating system according to an embodiment of the present disclosure.

Please refer to FIG. 1, which illustrates a block diagram of the project generating system according to an embodiment of the present disclosure. As shown in FIG. 1, The project generating system 10 comprises a communication device 1, a non-transitory computer-readable medium 3, and a processing device 5. The processing device 5 electrically connects to the communication device 1 and the non-transitory computer-readable medium 3.

The communication device 1 communicably connects to the internet N to obtain a plurality of text files from a first server V1, a plurality of review file from a second server V2, and an internet volume of a word from a third server V3. In practice, the first server V1 is such as a news website or a bulletin board system (BBS) providing a plurality of categorized articles. The second server V2 shows a plurality of review files, review articles for example, belonging to a specific aspect, such as tourism or food. The third server V3 provides an internet search website, such as Google.

The non-transitory computer-readable medium 3, such as a memory or a hard disk, may store a plurality of instructions and text files. The present disclosure does not limit the hardware type of the non-transitory computer-readable medium 3.

The processing device 5 may perform a plurality of instructions stored in the non-transitory computer-readable medium 3 and thus cause a plurality of operations. It should be noticed that the processing device 5 illustrated in FIG. 1 is an example and is not a limitation to the number of the processing devices of the project generating system 10. The operations caused by the processing device 5 are described together with FIG. 2 in the following paragraphs.

Figure 2:
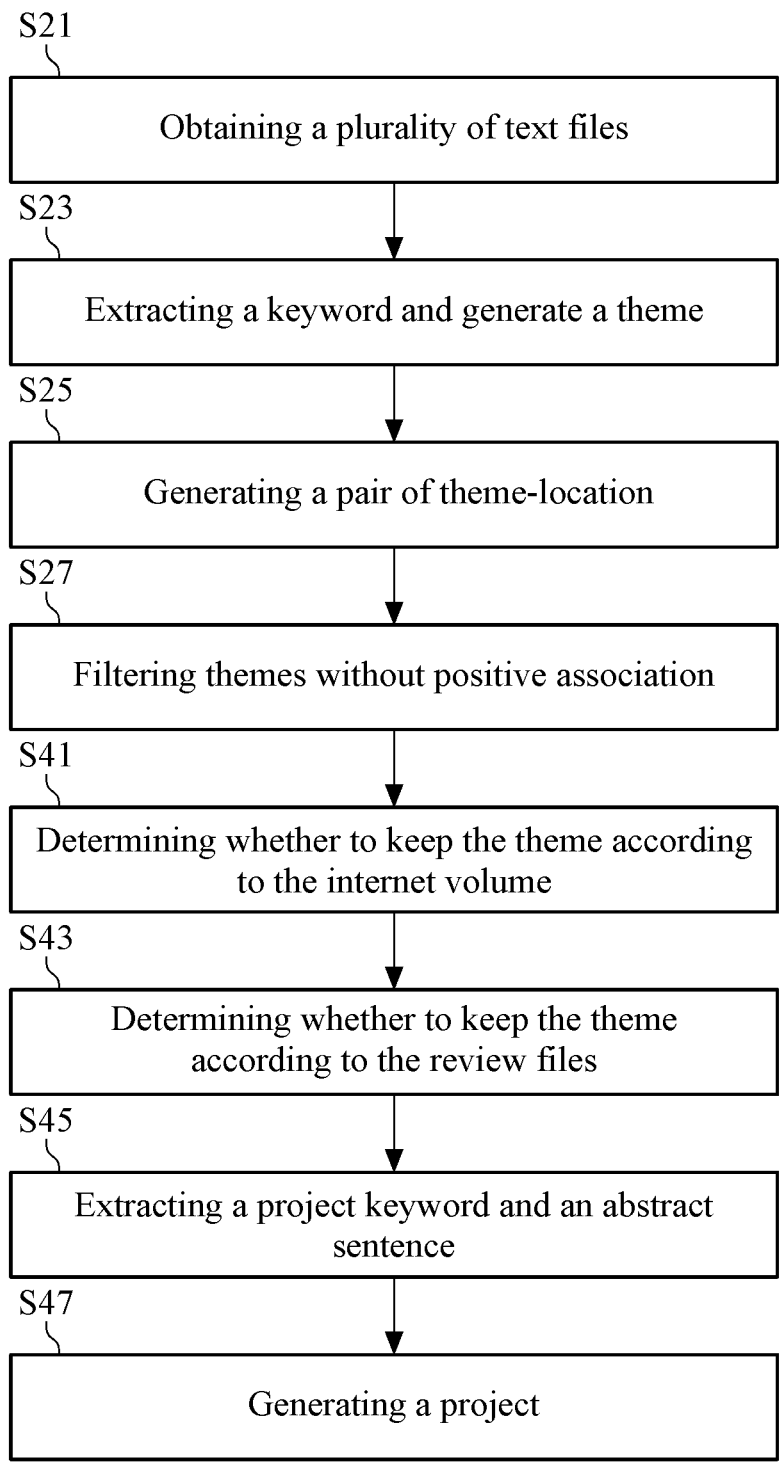
FIG. 2 is a flowchart of the projecting generating method according to an embodiment of the present disclosure.

Please refer to FIG. 2, which illustrates the project generating method according to an embodiment of the present disclosure. The project generating method is adapted to the project generating system 10 described previously.

Please refer to step S21, "Obtaining a plurality of text files". Each of the text files belongs to one of a plurality of categories. Specifically, the communication device 1 obtains articles of a plurality of external categories from news websites or entrance websites and obtains the titles of these external categories, such as "Entertainment", "Sports", "Food", and "Politics". The communication device 1 converts the articles of webpages into text files by Extract-Transform-Load (ETL). The text files are, for example, CSV files, and are stored in the non-transitory computer-readable medium 3.

In the first embodiment, although each of the text files belongs to one of the plurality of categories, these text files are actually stored according to a plurality of internal categories. There is a correspondence relationship between the internal category and the external category, and an example thereof is shown in the following table.

| External category | Internal Category |
|---|---|
| Forum P, Mobile games | Entertainment |
| Website Y, Sports | Sports |
| Website T, Food | Gourmet |
| Forum P, Movie | Entertainment |
| Website Y, Politics | Politics |
| Not matched | Others |

In the first embodiment, the processing device 5 designates each of the text files as in one of the plurality of internal categories according to a correspondence relationship between the plurality of external categories and the plurality of internal categories. For example, the processing device 5 designates the article whose external category is "Movie" of the Forum P as the internal category of "Entertainment".

In the second embodiment, there text files are stored according to the external categories.

Please refer to step S23, "Extracting a keyword and generating a theme." Specifically, the processing device 5 extracts one (or more) keyword from the plurality of text files, calculates a theme parameter of the keyword, and determines whether the keyword is a theme according to the theme parameter. In practice, the processing device 5 extracts the keyword from the text files by adopting algorithms such as term frequency-inverse document frequency (tf-idf) or text rank. The theme parameter is a ratio of the number of articles including the keyword to the number of all articles. For example, the processing device 5 extracts 100 text files and a default threshold is 0.7. If there are more than 70 text files whose contents have a keyword "Pokemon", the keyword "Pokemon" is determined to be a theme.

Please refer to step S25, "Generating a pair of theme-location". Specifically, the processing device 5 searches geographical names from those text files whose contents include the theme, and generates pairs based on the theme and the geographical names, for example, "Pokemon-Nanliao", "Pokemon-Hsinchu", wherein both of Nanliao and Hsinchu are geographical names of Taiwan.

Please refer to step S27, "Filtering themes without positive association". Step S27 is applied for further selecting pairs having positive association with tourism from those generated in step S25. The following paragraphs show three different ways to describe the specific implementation of the processing device 5 in step S27, but the present disclosure is not limited thereto.

In the first way carrying out step S27, the processing device 5 obtains a category list with a plurality of positive categories. The plurality of positive categories belongs to a subset of the plurality of internal categories. For example, there are 50 internal categories, 35 categories of these 50 internal categories that are highly relevant to tourism could be viewed as the positive categories. The processing device 5 calculates a distribution of text files including the theme in every internal category, calculates a positive parameter of the theme according to a sum of the distribution ratio of the positive categories, and determines whether to keep the theme according to whether the positive parameter of the theme exceeds a threshold. For example, regarding all text files whose contents include the keyword "Pokemon", the distributions of those text files to the internal categories comprise 10% in "Entertainment", 15% in "Sports", 5% in "Food", and 10% in "Others", and it assumes the positive categories are "Entertainment" and "Food" and the threshold of positive parameter is 70%. The theme "Pokemon" is highly associated with tourism since 70%+5%>70% and should be kept.

The calculation of the positive parameter of the above first embodiment is based on an assumption that "each of the internal categories contributes the same positive degree corresponding to tourism". In practice, every internal category may further comprise a weight and the formula of the positive parameter is a sum of products of the distribution ratio and the weight values In the second way carrying out step S27, the processing device 5 obtains a category list with a plurality of positive categories, and the plurality of positive categories belongs to a subset of the external categories. Each of the external categories has a weighted value. The weighted values of the external categories are automatically adjusted based on the feedback of past data. The positive parameter is a sum of products, wherein the products are products of a plurality of distribution ratios of the theme corresponding to the plurality of positive categories and the plurality of weighted values of external categories.

Figure 3:
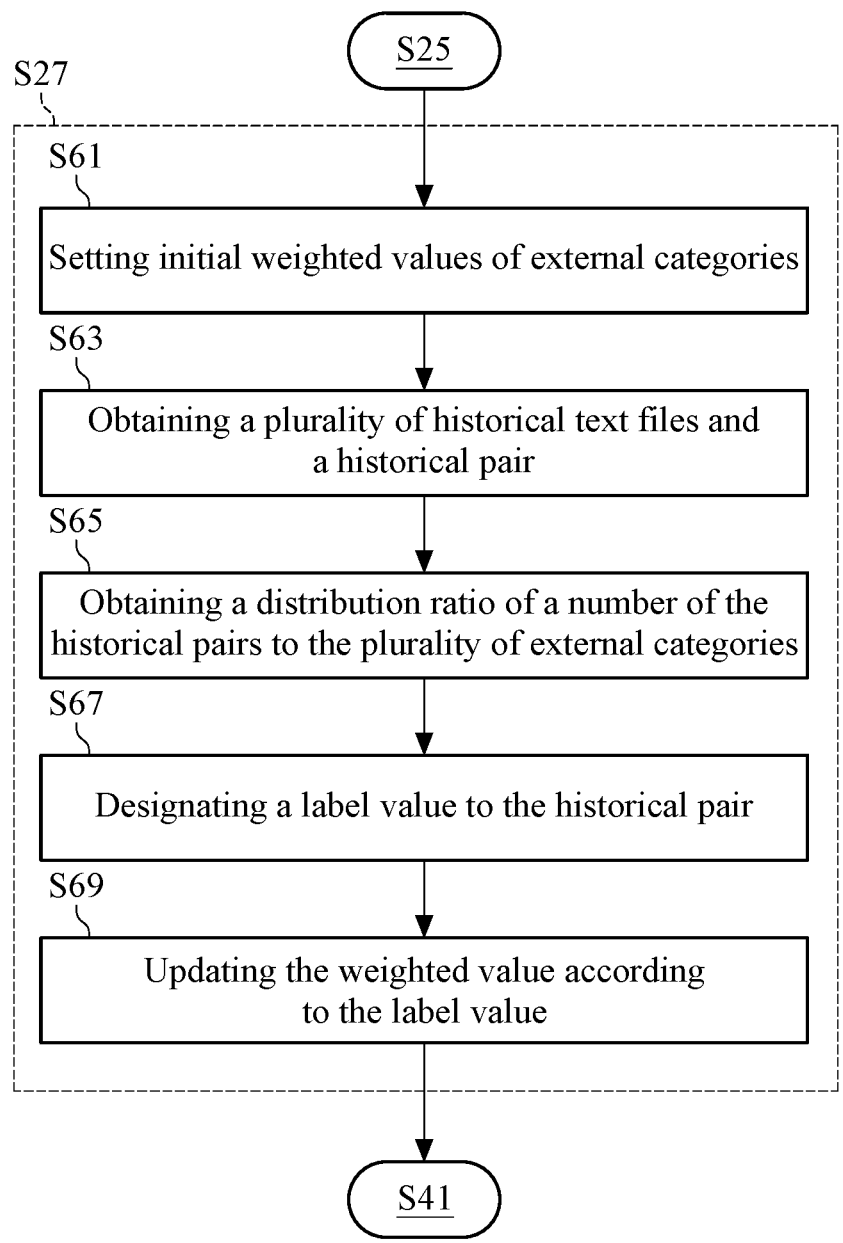
FIG. 3 is a flowchart of adjusting weighted values of external categories of the projecting generating method according to the second embodiment of the present disclosure.

Please refer to FIG. 3, which illustrates how to adjust the weighted values of the external categories. Every step in FIG. 3 will be described with a simplified example in the following.

Please refer to step S61, "Setting initial weighted values of external categories". For example, there are three external categories, such as "mobile games'", "sports" and "politics", and the weighted values of these three external categories are set as ⅓ initially.

Please refer to step S63, "Obtaining a plurality of historical text files and a historical pair". There is a plurality of historical text files, and each of the plurality of historical text files belongs to one of the plurality of external categories. The historical text files are obtained when this project generating method of the present disclosure is performed previously. Based on a sliding time window, the processing device 5 obtains part of the historical text files and historical pairs corresponding to these historical text files from the time-ordered historical files. The historical pairs are generated when the step S25 is performed previously, and each of the historical pairs comprises a theme and a location.

Please refer to step S65, "Obtaining a distribution ratio of a number of the historical pairs to the plurality of external categories". Specifically, the processing device 5 calculates distribution ratios related to the plurality of external categories, wherein each distribution ratio is a number of those historical text files whose contents comprise the historical pair to a number of those historical text files. For example, the distribution ratio of the historical pair "Pokemon-Nanliao" is 70% in "Mobile games", 20% in "Sports", and 10% in "Politics".

Please refer to step S67, "designating a label value to the historical pair". Specifically, in this step S67, one or more users may be asked to determine whether the theme in the historical pair has a positive correlation with tourism through a manner of questionnaire, with the label value representing the positive correlation degree of the historical pair. For example, if the one or more users determine that the historical pair "Pokemon-Nanliao" is in positive correlation with tourism, the label value should be set to "1", otherwise, the label value should be set to "0". The label value may also be expressed by three values of "1", "0.5", and "0" to indicate high, medium, and low correlation degrees to tourism. The present disclosure does not limit the digital types and their representations of label values.

Please refer to step S69, "Updating the weighted value according to the label value". For example, regarding the historical pair "Pokemon-Nanliao", the functions for updating the weighted values are described as follows.

$$\text{mobile-game}_w=(1+0.7)/(3+1)$$

$$\text{exercise}_w=(1+0.2)/(3+1)$$

$$\text{politics}_w=(1+0.1)/(3+1)$$

wherein "mobile-game$_w$" is the weighted value of the external category "Mobile games", exercise$_w$ is the weighted value of the external category "Sports", and "politics$_w$" is the weighted value of the external category "Politics".

Alternatively, another example for updating the weighted values is illustrated as follows. Under the assumption that another historical pair "Dengue fever-Kaohsiung" is obtained in step S63. Furthermore, in step S65, the historical pair "Dengue fever-Kaohsiung" is 0% in "Mobile games", 0% in "Sports, and 100% in "Politics". In step S67, the one or more users set the label value to 0 since this historical pair has no positive correlation with tourism. Therefore, in step S69, regarding the historical pair "Dengue fever-Kaohsiung", the weighted values of external categories are updated as the following.

$$\text{mobile-game}_w=(1+0.7-0)/(3+1+1)$$

$$\text{exercise}_w=(1+0.2-0)/(3+1+1)$$

$$\text{politics}_w=(1+0.1-1)/(3+1+1)$$

Similar to the above example, step S63-69 may be repeated for several times according to different historical pairs, and the updated external categories may be normalized so that the weighted values are between 0 and 1. For example, if the weighted values after calculation is negative, this negative value will be correct to zero.

The weighted values of the external categories updated according to the flow of FIG. 3 could be used to calculate a positive parameter of the theme. For example, under the assumption that the updated weighted value of the external category "Mobile games" is 0.87, the updated weighted value of the external category "Sports" is 1, and the updated weighted value of the external category "Politics" is 0, the processing device 5 calculates the positive parameters of the historical pair "Pokemon-Nanliao" as the following.

$$0.7*0.87+0.2*1+0.1*0=0.809$$

In view of the above, in step S27 of FIG. 2, the processing device 5 could be configured to keep the theme whose positive parameter is larger than a threshold (such as 0.7), so that the "theme-location" pair with highly positive correlation with tourism could be generated. Furthermore, this second way could save the processing time for the processing device 5 to additionally reclassify the text file of the external category into the internal category.

In the third way carrying out step S27, the processing device 5 obtains a category list with a plurality of positive categories, wherein one of the positive categories comprises one or more positive sub-categories. In other words, the positive category and the positive sub-category have a multi-level relationship. For example, the positive category is "outdoor category" and the positive sub-category is "mountain-climbing", "Marathon". Positive categories and positive sub-categories in the category list belong to subsets of the internal (or the external) categories. The processing device 5 determines whether the category related to a theme may match a positive sub-category and the positive category having this positive sub-category and keep the theme according to the determination result. For example, the theme "ridge hiking" may match the positive category "outdoor activity" and the positive sub-category "mountain climbing" under the positive category "outdoor activity". Therefore, the processing device 5 keeps the theme "ridge hiking". The processing device 5 does not keep the theme without sufficient positive association if the theme does not have a multi-level match relation as described above.

In other embodiment of the present disclosure, a step S41 to be discussed later may be performed right after the pair is generated in step S25 so as to improve the overall processing speed. However, the step S27 may efficiently improve the project quality by filtering out themes without positive association with tourism. In practice, should step S27 be performed or not could depend on the requirement, and the present disclosure is not thus limited.

Please refer to step S41, "Determining whether to keep the theme according to the internet volume". Specifically, the processing device 5 inquiries the internet volume from the third server V3 through the communication device 1, for example, Google trends or QSearch. The processing device 5 keeps the theme whose internet volume is greater than a threshold, or keeps the theme whose internet volume have an increasing trend (gradually or suddenly increasing), or keeps the theme whose internet volume is greater than the threshold and has an increasing trend. For example, themes obtained by the processing device 5 are listed as follows.

Theme
Pokemon
Seafood
Wetland

Regarding those themes kept in step S41, the processing device 5 further determines whether these "popular" themes may be helpful in promoting tourism in specific locations. The specific locations comprise locations represented by the geographical names of the pairs (hereinafter referred to as "core name") and locations represented by other geographic names associated with the core name (hereinafter referred to as "peripheral name").

Please refer to step S43, "Determining whether to keep the theme according to the review files". Specifically, the processing device 5 confirms the core names and the peripheral names which are used to filter the review files, and then the processing device 5 filters a plurality of review files of a review website according to these names. The review website is, for example, an international travel and restaurant website, "TripAdvisor". The sources of the review files are travel blogs or travel articles. Specifically, the processing device 5 obtains a peripheral name according to a core name and a geographical topology. The peripheral name is associated with the core name of the pair. The relationship between the core name and the peripheral name could be that the corresponding location of the peripheral name is an administrative district of the location of the core name, or that a geographical distance between the location of the peripheral name and the location of the core name is shorter than a threshold. For example, in a situation that the core name of the pair is Taipei City, the peripheral names obtained by the processing device 5 according to the geographical topology may comprises: Xinyi District and Wanhua District of Taipei City), as well as Banqiao District and PingXi District neighboring Taipei City. Thus, the core names and peripheral names obtained by the processing device 5 are listed as follows.

| Theme | Geographic Name |
| --- | --- |
| Pokemon | Nanliao (core name) |
| Seafood | Nanliao (core name) |
| Wetland | Siangshan Wetland (Peripheral name) |

After the core names and the peripheral names used to filter the review file are confirmed, based on the plurality of filtered review files, the processing device 5 calculates the first rate of a number of the review files whose contents include the theme to a number of all filtered review files, and determines whether to keep the theme according to the first rate. For example, regarding the plurality of travel blogs filtered by the geographic name "Nanliao", if there are more than 80% blogs whose contents mention "Pokemon", it means that the pair "Pokemon-Nanliao" attracts people to travel to Nanliao indeed because of the increasing Internet volume of the theme "Pokemon".

Please refer to S45, "Extracting a project keyword and an abstract sentence." Specifically, the processing device 5 extracts the project keyword and the abstract sentence associated with the project keyword from review files filtered by core names or peripheral names. The manner of extracting the project keyword is similar to S23, while the difference is that step S23 performs the extraction based on text files of multiple categories without limit in specific aspects, but step S47 performs the extraction based on review files with specific aspect, that is, travel in this embodiment. In other words, the project keyword is another keyword in the travel review files, wherein said another keyword is associated with the theme. The abstract sentence is associated with the context of the project keyword. Thus, the project keywords obtained by the processing device 5 are listed as follows.

| Theme | Geographic Name | Project Keyword | Abstract Sentence |
| --- | --- | --- | --- |
| Pokemon | Nanliao | Lapras | . . . |
| Seafood | Nanliao | Sashimi | . . . |
| Wetland | Siangshan Wetland | Fiddler crab | . . . |

Please refer to step S47, "Generating a project". Specifically, after extracting the project keyword in step S45, the processing device 5 further calculates a plurality of second ratios, wherein each second ratio is a number of the text files whose contents include the project keyword to a number of text files of a certain internal (or external) category. Based on the maximum value of these second ratios, the processing device 5 selects one internal (or external) category and generates a project. The project comprises a plurality of recommendation rows. Each recommendation row comprises the core name (or the peripheral name), the theme corresponding to the core name, the project keyword, the selected category, and the abstract sentence. The example of the project is shown as the following table.

| Theme | Geographic Name | Project Keyword | Abstract Sentence | Category |
| --- | --- | --- | --- | --- |
| Pokemon | Nanliao | Lapras | . . . | Entertainment |
| Seafood | Nanliao | Sashimi | . . . | Gourmet |
| Wetland | Siangshan Wetland | Fiddler crab | . . . | Parent-Child |

In view of the above, the present disclosure proposes a project generating system and method thereof to obtain themes, which can exactly bring tourists, from complicated internet information, and to generate a project according to the theme automatically. Furthermore, the present disclosure proposes a method to filter themes irrelevant to a specific aspect so that generates an available location recommendation. In addition, the projecting generating system and method thereof are adapted to search themes and locations from a specific aspect, and these themes and locations may bring tourists. Regarding the tourism, the present disclosure may automatically determine a theme serving as a traveling motivation for people, take the location highly relevant to the theme as a core location to recommend a plurality of traveling attractions with regional high internet volumes, and finally generate a project with traveling locations for the reference of marketing specialists.

What is claimed is:

1. A project generating method configured to be performed by a computer, with said project generating method comprising:
   obtaining a plurality of text files, wherein each of the text files belongs to one of a plurality of categories;
   extracting a keyword from the plurality of text files and calculating a theme parameter of the keyword to determine whether the keyword is a theme;
   extracting a geographical name from the plurality of text files corresponding to the theme and defining the theme and the geographical name as a pair;
   determining whether to keep the theme according to an internet volume of the theme after the pair is generated;
   filtering a plurality of review files from a review website according to the geographical name to obtain filtered review files after the theme is determined to be kept according to an internet volume;
   calculating a first rate of the theme, wherein the first rate is a rate of a number of a part of the filtered review files referring the theme to a total number of the filtered review files, and determining whether to keep the theme according to the first rate; and
   generating a project after the theme is determined to be kept according to the first rate, wherein the project comprises a recommendation row comprising the geographical name and the theme; wherein
   after defining the theme and the geographical name as the pair and before the theme is determined to be kept according to the internet volume of the theme,
   obtaining a category list comprising a plurality of positive categories, wherein one of the positive categories comprises a positive sub-category, and the plurality of positive categories and the positive sub-category are subsets of the plurality of categories; and
   determining whether to keep the theme according to whether two of the plurality of categories corresponding to the theme of the pair are the positive sub-category and the positive category comprising the positive sub-category.

2. The project generating method of claim 1, after the pair is generated and before the theme is determined to be kept according to the internet volume, further comprising:
   obtaining a category list with a plurality of positive categories, wherein the plurality of positive categories belongs to a subset of the plurality of categories;
   calculating a positive parameter of the theme of the pair, with said positive parameter representing a relationship between the theme of the pair and the plurality of positive categories; and
   determining whether to keep the theme by a result of whether the positive parameter exceeds a threshold.

3. The project generating method of claim 2, wherein each of the plurality of categories comprises a category weight, and the positive parameter relates to a plurality of correlation rates of the plurality of positive categories and the plurality of category weights, wherein the plurality of positive categories corresponds to the keyword.

4. The project generating method of claim 3, before obtaining the plurality of text files, further comprising:

obtaining a plurality of historical text files, wherein each of the plurality of historical text files belongs to one of the plurality of categories;
   setting an initial weight to each of the plurality of categories;
   obtaining a historical pair from the plurality of historical text files according to a sliding window and calculating a distribution ratio of a number of the historical pairs to the plurality of categories;
   designating a label value to the historical pair; and
   updating the plurality of initial weights according to the label value to obtain a plurality of updated initial weights, and taking the plurality of updated initial weights as the plurality of category weights.

5. The project generating method of claim 1, wherein each of the plurality of text files comprises one of a plurality of external categories and the project generating method further comprises: before extracting the keyword from the plurality of text files, designating each of the text files as a respective one of the plurality of categories according to a correspondence relationship between the plurality of external categories and the plurality of categories.

6. The project generating method of claim 1, wherein the theme parameter is a third rate of a number of a part of a plurality of text files comprising the keyword to a number of the plurality of text files.

7. The project generating method of claim 1, wherein the geographical name is a core name and before the plurality of review files is filtered, the project generating method further comprises:
   obtaining a peripheral name related to the core name according to a geographical topology; and
   filtering the plurality of review files from a review website according to the peripheral name.

8. The project generating method of claim 7, wherein a place of the peripheral name is in an administrative district of a place of the core name, or a geographical distance between the place of the peripheral name and the place of the core name is shorter than a threshold.

9. The project generating method of claim 1, wherein determining whether to keep the theme according to an internet volume of the theme comprises: determining whether the internet volume is greater than a threshold or whether the internet volume shows an increasing trend.

10. The project generating method of claim 1, wherein extracting the keyword from the plurality of text files is performed based on a term frequency-inverse document frequency algorithm or a text rank algorithm.

11. The project generating method of claim 1, after the theme is determined to be kept according to the first rate, further comprising:
    after the theme is determined to be kept according to the first rate, from the plurality of filtered review files, extracting a project keyword and an abstract sentence related to the project keyword; and
    calculating a plurality of third rates of the plurality of categories and selecting one of the plurality of categories according to the plurality of third rates, wherein the plurality of categories corresponds to a project keyword;
    wherein the recommendation row further comprises the project keyword, the selected category, and the abstract sentence.

12. A project generating system comprising
    a communication device configured to obtain a plurality of text files from a first server, obtain a plurality of review file from a second server, and obtain an internet volume of a word from a third server;

a non-transitory computer-readable medium configured to store a plurality of instructions; and one or more processing devices electrically connecting to the communication device and the non-transitory computer-readable medium, wherein the one or more processing device is configured to perform the plurality of instructions and cause a plurality of operations and the plurality of operations comprises:

extracting a keyword from the plurality of text files and calculating a theme parameter of the keyword to determine whether the keyword is a theme, wherein each of the text files belongs to one of a plurality of categories;

extracting a geographical name from the plurality of text files corresponding to the theme and defining the theme and the geographical name as a pair;

determining whether to keep the theme according to an internet volume of the theme after the pair is generated;

filtering a plurality of review files from a review website according to the geographical name to obtain filtered review files after the theme is determined to be kept according to an internet volume;

calculating a first rate of the theme, wherein the first rate is a rate of a number of a part of the filtered review files referring the theme to a total number of the filtered review files, and determining whether to keep the theme according to the first rate; and generating a project after the theme is determined to be kept according to the first rate, wherein the project comprises a recommendation row comprising the geographical name and the theme; wherein the plurality of operations further comprises:

after defining the theme and the geographical name as the pair and before the theme is determined to be kept according to an internet volume of the theme, obtaining a category list comprising a plurality of positive categories, wherein one of the positive categories comprises a positive sub-category, and the plurality of positive categories and the positive sub-category are subsets of the plurality of categories; and determining whether to keep the theme according to whether two of the plurality of categories corresponding to the theme of the pair are the positive sub-category and the positive category comprising the positive sub-category.

13. The project generating system of claim 12, wherein the plurality of operations further comprises:

after the pair is generated and before the theme is determined to be kept according to the internet volume, obtaining a category list with a plurality of positive categories, wherein the plurality of positive categories belongs to a subset of the plurality of categories;

calculating a positive parameter of the theme of the pair, with said positive parameter representing a relationship between the theme of the pair and the plurality of positive categories; and determining whether to keep the theme by a result of whether the positive parameter exceeds a threshold.

14. The project generating system of claim 13, wherein each of the plurality of categories comprises a category weight, and the positive parameter relates to a plurality of correlation rates of the plurality of positive categories and the plurality of category weights, wherein the plurality of positive categories corresponds to the keyword.

15. The project generating system of claim 14, wherein the plurality of operations further comprises:

before obtaining the plurality of text files, obtaining a plurality of historical text files, wherein each of the plurality of historical text files belongs to one of the plurality of categories;

setting an initial weight to each of the plurality of categories;

obtaining a historical pair from the plurality of historical text files according to a sliding window and calculating a distribution ratio of a number of the historical pairs to the plurality of categories;

designating a label value to the historical pair; and updating the plurality of initial weights according to the label value to obtain a plurality of updated initial weights, and taking the plurality of updated initial weights as the plurality of category weights.

16. The project generating system of claim 12, wherein each of the plurality of text files comprises one of a plurality of external categories and the project generating method further comprises: before extracting the keyword from the plurality of text files, designating each of the text files as a respective one of the plurality of categories according to a correspondence relationship of the plurality of external categories to the plurality of categories.

17. The project generating system of claim 12, wherein the theme parameter is a third rate of a number of a part of a plurality of text files comprising the keyword to a number of the plurality of text files.

18. The project generating system of claim 12, wherein the geographical name is a core name and before the plurality of review files is filtered, the plurality of operations further comprises:

obtaining a peripheral name related to the core name according to a geographical topology; and filtering the plurality of review files from a review website according to the peripheral name.

19. The project generating system of claim 18, wherein a place of the peripheral name is in an administrative district of a place of the core name, or a geographical distance between the place of the peripheral name and the place of the core name is shorter than a threshold.

20. The project generating system of claim 12, wherein after the theme is determined to be kept according to the first rate, the plurality of operations further comprises:

after the theme is determined to be kept according to the first rate, from the plurality of filtered review files, extracting a project keyword and an abstract sentence related to the project keyword; and calculating a plurality of third rates of the plurality of categories and selecting one of the plurality of categories according to the plurality of third rates, wherein the plurality of categories corresponds to a project keyword;

wherein the recommendation row further comprises the project keyword, the selected category, and the abstract sentence.

* * * * *